United States Patent [19]

Marshall

[11] Patent Number: 4,714,327
[45] Date of Patent: Dec. 22, 1987

[54] OBLIQUE OBSERVATION ATTACHMENT FOR MICROSCOPES

[75] Inventor: Charles H. Marshall, Washington, D.C.

[73] Assignee: Westinghouse Electric Corp., Pittsburgh, Pa.

[21] Appl. No.: 839,489

[22] Filed: Mar. 14, 1986

[51] Int. Cl.$^4$ ............................................. G02B 21/18
[52] U.S. Cl. ...................................... 350/504; 350/511
[58] Field of Search ................................ 350/503–505, 350/507, 522, 571–572, 624, 511

[56] References Cited

U.S. PATENT DOCUMENTS

| | | | |
|---|---|---|---|
| 2,218,270 | 10/1940 | Snook | 350/504 |
| 2,478,762 | 8/1949 | Johnson | 350/503 |
| 3,185,927 | 5/1965 | Margulis et al. | 324/158 |
| 3,229,576 | 1/1966 | Rees | 350/503 |
| 3,537,795 | 11/1970 | Clerc | 356/51 |
| 3,588,220 | 6/1971 | Paine | 350/503 |
| 3,667,827 | 1/1972 | Lawrence | 350/503 |
| 3,868,171 | 2/1975 | Hoppl | 350/522 |
| 3,986,767 | 10/1976 | Rexer et al. | 350/624 |
| 4,091,814 | 5/1978 | Togo | 128/303.1 |
| 4,264,203 | 4/1981 | Pirlet | 356/241 |
| 4,299,439 | 11/1981 | Stromblad | 350/522 |

FOREIGN PATENT DOCUMENTS

| | | | |
|---|---|---|---|
| 2601610 | 7/1977 | Fed. Rep. of Germany | 350/522 |
| 2710995 | 9/1977 | Fed. Rep. of Germany | |

Primary Examiner—William H. Punter
Attorney, Agent, or Firm—W. G. Sutcliff

[57] ABSTRACT

An oblique observation attachment for use in conjunction with a microscope comprising a repositionable planar mirror and a plano-elliptical mirror; or a second planar mirror incorporated into an elliptical track follower in a predetermined configuration operable in a three axis cartesian coordinate system to provide hands-free, fixed focus, optical inspection of populated planar subjects on an X-Y oriented stage such as the soldered joints of hybrid micro-electronic circuits or printed circuit wiring boards.

11 Claims, 6 Drawing Figures

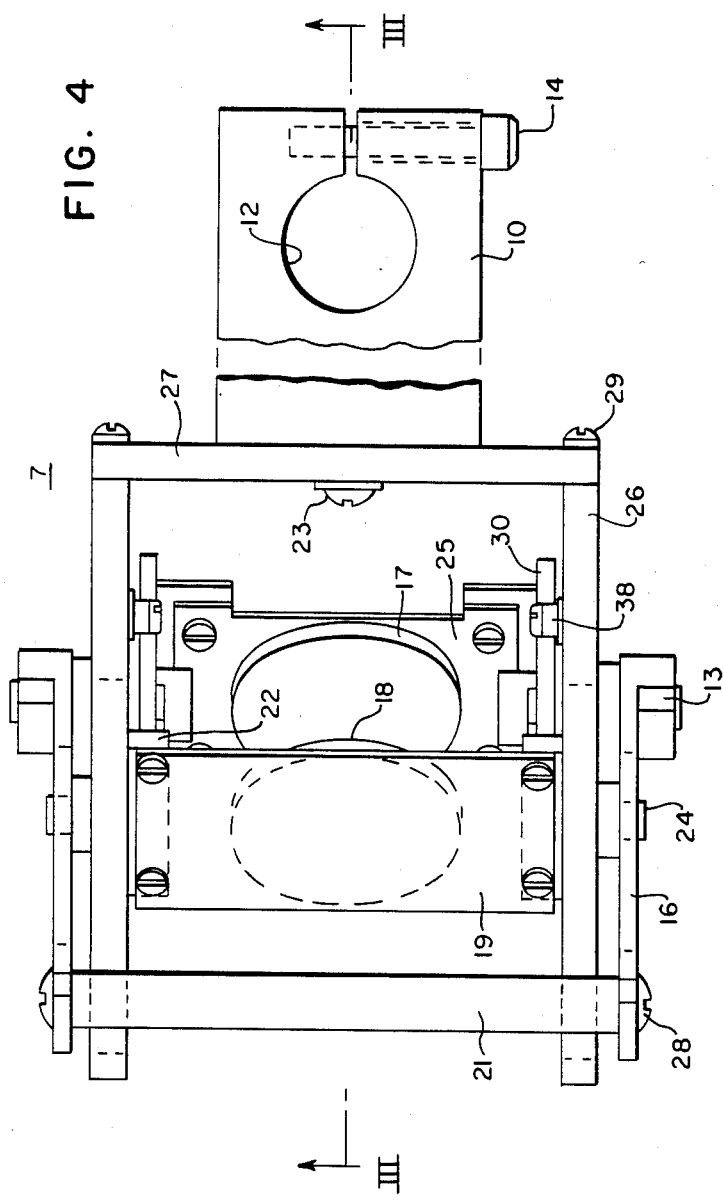

OBLIQUE OBSERVATION ATTACHMENT FOR MICROSCOPES

BACKGROUND OF THE INVENTION

1. Field of the Invention

The present invention relates to an oblique observation attachment operable for use with microscopes providing visual inspection of planar subjects on an X-Y stage. Use of this attachment permits subjects to remain fully centered in the field of view of the microscope objective lens and in focus while the attachment is in use. The visual perspective of the observer shifts from a perspective normal to the subject through to a visual perspective oblique to the subject without repositioning of the subject or refocusing of the microscopes objective lens.

2. Description of the Prior Art

Inspection of populated planar products such as dual in-line packages (DIP's) of electronic circuitry requires the inspector to make observations with magnification from angles other than perpendicular to the focal plane of the circuit board subject. Careful inspection is required of solder joints interconnecting the pins of a chip package to a circuit board for defects and imperfections.

In the prior art, inspection of soldered populated planar products such as microelectronic hybrid circuit boards or printed wiring boards was a difficult task. As the latitudinal perspective changed during visual inspection under a microscope the optical distance between the microscope objective lens and the object of interest did not remain constant. Continual focusing and refocusing was required by the human hand of the microscope while manipulating the populated planar product beneath the objective lens of the microscope.

This practice of visual inspection also precluded the utilization of a preprogrammed automated inspection method. Consequently, all of such visual inspections made using a manual means were time consuming and inefficient.

The patent to L. T. Johnson entitled "Reflecting Microscope", U.S. Pat. No. 2,478,762 dated Aug. 9, 1949 discloses a reflecting microscope formed with a combination of an off-axis ellipsolidal mirror in combination with straight mirrors, the off-axis elliposolidal mirror having two focii shown in use with two plane mirrors. Light from an object is reflected from a first plane mirror as if it had come from a first focus on the ellipsoidal mirror. This light is reflected towards a second focus on the ellipsoidal mirror but the reflected light is intercepted by a second plane mirror and reflected back to the first focus of the ellipsoidal mirror. Multiple reflections between the two planar mirrors and the ellipsoidal mirror result in the light eventually passing through an aperture in the second planar mirror, and finally, the objective lens of the microscope itself to the awaiting human eye.

The patent to L. G. Margulis et al. U.S. Pat. No. 3,185,927 dated May 25, 1965 entitled "Probe Instrument for Inspecting Semiconductor Wafers Including Means for Marking Defective Zones" discloses a testing mechanism for manipulatively probing semiconductor wafer slabs having a plurality of regularly disposed individual indicia thereon whereby the electrical characteristics of the individual chips or components can be measured and inspected prior to dicing. A microscope is utilized in conjunction with the preferred embodiment of the Margulis invention preferably oriented so that the microscope has a 45° angle existing between the axis of the objective lens and the top of the pedestal which holds the semiconductor slab.

The patent to M. Clerc entitled "Optical Scanning Device for Rapid Spectroscopy", U.S. Pat. No. 3,537,795 dated Nov. 3, 1970, discloses an optical scanning device for rapid spectroscopy. In the preferred embodiment of the Clerc invention a first rotating mirror having two reflective surfaces receives a beam of dispersed energy for observational purposes. A variation on the preferred embodiment of the Clerc invention utilizes four fixed elliptical mirrors having a first common focus at the intersection of the plane with the axis of rotation of the rotating first mirror. The second focus for two of the elliptical mirrors at a second focal point and a third focal point for the remaining two elliptical mirrors will receive any illuminous ray coming from the first focal point of all four elliptical mirrors. This will occur when all optical paths are then equal due to the fundamental property of ellipsoids.

Finally, the U.S. patent to T. Togo entitled "Laser Optical Apparatus for Operations Under a Microscope", U.S. Pat. No. 4,091,814 dated May 30, 1978 discloses a laser optical apparatus for operations under a microscope, visible light from an object is reflected by a plane mirror and formed into parallel rays of light by a parabolic mirror. These rays of light pass by the opposite sides of the 45° reflector into a magnification electro-optical system. A control means operable to rotate the plane reflector about the vertical axis by means of a first servo-motor and about the horizontal axis by a second servo-motor is also incorporated into this design.

The problem to be solved therefore is the problem of optically inspecting the soldered joints of a printed wiring board or hybrid micro-electronic assembly from a normal and oblique perspective without the use of the human hand to refocus the microscope or move the subject in the field of view.

Some commercially available hardware does address this problem, for example, the Wild Hierburgg limited attachment for vertical and oblique observation for M3/M5A/M7AM/M7S, stock No. 422482 has addressed this problem. However, this design has the following shortcomings:

The mirrors must be shuttled in for oblique observation. This increase in the length of the optical path is compensated by the divergent lens, however, this lens also diverges light from any coaxial illuminator rendering it inadequate.

The mirrors can make oblique viewing possible only from one angle.

A solution to these problems is presented by the preferred embodiment of this invention, which would allow an inspector of printed circuit boards and hybrid microelectronic circuit chips to no longer use the human wrist and hand as a gimballed system. The possibility of a fully automated inspection station including intelligent vision systems would become more feasible.

SUMMARY OF THE INVENTION

The present invention is directed to the examination of populated planar product having soldered joints such as hybrid micro-electronic circuit or printed wiring board from a hemispherical perspective. As the latitudinal perspective changes, the optical distance between the microscope objective lens and the subject of interest remains constant. The microscope, therefore, requires no focus adjustment.

The key components of this oblique observation attachment are:

A planar mirror pivotable about the Z axis through a first focal point.

A plano-elliptical mirror whose focii are at two distance focal points.

A rotating support ring operable to rotate about the Y axis.

A retaining ring and supports for the pivoting planar mirror.

The subject of interest is located upon a stage operable to support the subject on an X-Y axis at the second focal point on the plano-elliptical mirror. As the planar mirror pivots about the first focal points of the plano-elliptical mirror, the elliptical mirror reflects the optical path through the second focal point of the plano-elliptical mirror. This reflection is due to the unique property of the ellipse. Furthermore, the length of the optical path from the first focal point on the plano-elliptical mirror to any point along the plano-elliptical mirror and then to the second focal point is constant. This is the second unique property of the ellipse.

These two unique properties of the ellipse assure that a subject will remain in the center of the field of view and also remain in focus when the oblique observation attachment is in use.

The hemispherical perspective is made complete by the rotation of the support ring about the Y axis. When it is desired to use the microscope in a conventional manner, the planar mirror is rotated into the vertical position. While in the vertical position the planar mirror will obstruct the optical path only by its own thickness and the planar mirror will appear out of focus. The subject under inspection will have to be refocused under the microscope when the attachment is used in this conventional manner because the removal of the planar mirror removes from the optical path the distance from the focii to the elliptical mirror.

A second embodiment of this invention demonstrates the orientation of the microscope and the mirror assembly in such a manner as to allow the useful portion of the elliptical mirror to subtend the 90° angle between the vertical and the plane of the subject under inspection.

By rotation of the X-Y stage upon which the subject rests about the vertical axis and rotation of the plane mirror about the first focal point, the full hemispherical perspective may be gained without focus adjustment of the microscope's objective lens.

In the third embodiment of this invention the optical axis of the microscope is positioned coaxially along a preselected linear optical segment. This optical path segment is reflected by a plane mirror operable to change positions along a second optical path segment. The optical path is again reflected by a plane mirror which is mounted to an elliptical track follower. This third embodiment utilizes an elliptical track follower in conjunction with a fixed planar mirror not unlike the plano-elliptical mirror is used in the first and second embodiments. This optical path allows the observer to normally examine the subject of interest which is located at a focal point upon the X-Y stage. When the planar mirrors are in the appropriate positions; the completed optical path permits the subject of interest to be viewed laterally.

The reduction gearing associated with the first planar mirror attached to a slotted handle, will cause the fixed planar mirror to move one-half the number of degrees as the second fixed mirror which is positioned a predetermined distance from the first planar mirror on an elliptical track follower. Rotation about the Z axis creates a full hemispherical perspective.

BRIEF DESCRIPTION OF THE DRAWINGS

For a better understanding of the invention reference may be had to the preferred embodiment exemplary of the invention shown in the accompanying drawings, in which:

FIG. 4 is a top plan view of a third embodiment of the oblique observation attachment as bisected by line III, III wherein a planar mirror is connected to a slotted handle and moved on this handle with respect to a second fixed planar mirror which is positioned on an elliptical track follower.

DESCRIPTION OF THE PREFERRED EMBODIMENT

Figure 1:
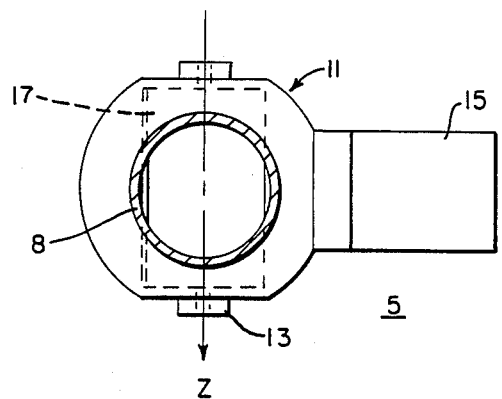
FIG. 1 is a plan view of the top of the preferred embodiment, an oblique observation attachment.
Figure 1A:
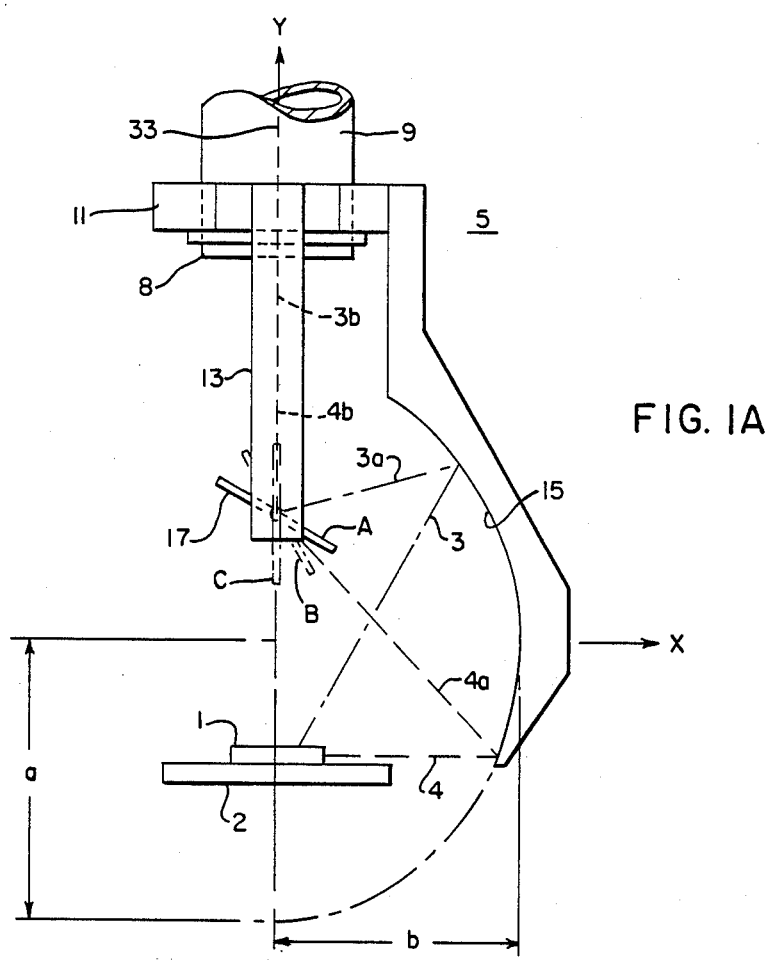
FIG. 1A is a cross section of the preferred embodiment of the oblique observation attachment as shown in FIG. 1.

To observe a populated planar subject 1 such as a soldered circuit board, resting upon an X-Y stage 2, an oblique observation attachment as in FIG. 1A has been invented.

FIG. 1 is a plan view of the top of the preferred embodiment of the oblique observation attachment, 5. A retaining ring 8 interconnects the oblique observation attachment 5 to a microscope barrel 9. Encircling the retaining ring 8 attached to the microscope barrel 9 is a support ring 11. This support ring is utilized to maintain a physical support for the planar mirror support members 13 and the plano-elliptical mirror 15. A planar reflective surface or mirror 17 is attached to the planar mirror support members 13 and is positioned rotatable about the Z axis.

In FIG. 1A the oblique observation attachment means 5 is visualized on an X, Y and Z cartesian coordinate system. In this preferred embodiment the planar mirror support members 13 are parallel to the Y axis. The retaining ring 8, microscope 9, and support ring 11 to which the planar mirror supports 13 are connected are all perpendicular to the Y axis and parallel to the X axis. The plano-elliptical mirror 15 is parallel to the Y axis and is positioned directly opposed to the planar reflector mirror 17. The X-Y position stage 2 is parallel to the X axis and perpendicular to the Y axis and is positioned upon the common colinear axis of the planar mirror support members 13. This X-Y position stage 2 is operable to support a populated planar subject 1, during the observation process. For example, optical energy 3 is reflected from the populated planar subject 1 which is resting upon the X-Y stage 2. This optical energy 3 is reflected towards the plano-elliptical mirror 15. The plano-elliptical mirror 15 reflects this optical energy 3 as 3a where optical energy 3a then strikes the planar reflective mirror 17. From the planar reflective mirror 17, energy 3a reflects as optical energy 3b into the microscope barrel 9. This describes the reflection of the optical energy 3 from the populated planar subject 1 when the planar mirror 17 is in position "A" as shown in FIG. 1.

If the mirror 17 is changed to position "B" another angle of view of the populated planar subject 1 is achieved. Optical energy 4 reflected from the populated planar subject 1 resting upon the X-Y stage 2 strikes the plano-elliptical mirror 15 at a point and is reflected as optical energy 4a. This optical energy 4a strikes mirror 17, while the mirror is in position "B" and a second reflection occurs so that optical energy, now 4b, is reflected up into the microscope 9.

The curvature of the plano-elliptical mirror 15 which allows the fixed observation of the populated planar subject 1 is defined by the mathematical equation:

$$X^2/b^2 + Y^2/a^2 = 1$$

where: dimension "a" is the distance from the midpoint of the plano-elliptical mirror 15 or one radius of the complete circle which could be made from the plano-elliptical mirror. And, dimension "b" is the width of the plano-elliptical mirror 15 to the mid-point of the X-Y stage 2.

In summary, as shown in FIG. 1A, the oblique observation attachment 5 allows the subject of interest, a populated planar subject 1, located upon an X-Y stage 2 to be observed through a series of oblique to normal views through a stationary unrefocused microscope 9. The planar mirror or planar reflective surface 17 pivots about a fixed point upon the planar support means or members 13. As the planar reflective mirror 17 pivots, the optical path of the optical energy from the populated planar subject 1 is reflected to different points along the plano-elliptical mirror 15. These various paths are dependent upon the position of the planar reflective surface 17 and are shown in this example as paths 3, 3a, 3b and 4, 4a, 4b.

A unique property of the ellipse is that the length of the optional reflected viewing path to any point along the plano-elliptical mirror 15 and back to the X-Y stage 2 will remain constant. This unique property assures that the populated planar subject 1 remains in the center of the field of view and in focus when this oblique observation attachment 5 is in use. A hemispherical perspective is achieved by rotation of the support ring 11 about the Y axis.

When it is desired to use the microscope 9 without the oblique observation attachment 5, the planar reflective means 17 can be rotated into a vertical position parallel to the Y axis, position "C". In this vertical position "C" the planar mirror 17 obstructs the optical path by only its thickness and will therefore appear merely out of focus. The subject or populated planar subject 1 would require manual refocusing due to the removal from the optical path of the focused previously point on the planar reflective surface 17 as reflected to the plano-elliptical mirror 15.

Figure 2:
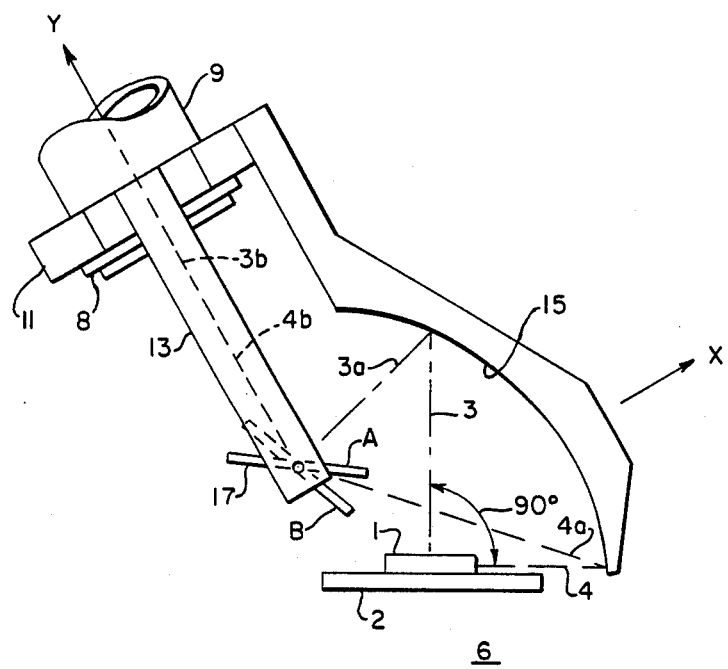
FIG. 2 is a cross-section of a second embodiment of the oblique observation attachment wherein the orientation of the microscope and mirror assembly allows the plano-elliptical mirror to subtend a 90° angle between the vertical and the plane of the subject under observation.

FIG. 2 is illustrative of a second embodiment of the oblique observation attachment 6, wherein the orientation of the microscope 9 and the planar reflective means 17 are such that the useful part of the plano-elliptical mirror 15 subtends the 90° angle between the Y axis and the plane of the X-Y stage 2. Rotation of the X-Y stage 2 upon which the populated planar 1 rests about a vertical or Y axis and by rotation of the planar mirror 17 about the predetermined point on the planar mirror supports 13 permits a full hemispherical perspective without focus adjustment. The optical path of light from the populated planar subject 1, in the oblique viewing mode, occurs when the planar reflective mirror 17 is in position B along path 4, 4a and 4b. To view the populated planar subject 1, from an optical position perpendicular to the subject 1, the planar reflective means 17 must be moved to position "A", and the optical path of light from the subject 1, is demonstrated as 3, 3a and 3b. Where light 3 strikes the plano-elliptical reflective means 15, and in turn is re-reflected as light 3a. This light 3a strikes the planar reflective means 17, which is in position "A". This light 3a, is then reflected by the planar reflective means 17 and reaches the eye piece of the microscope 9 as light 3b.

Figure 3:
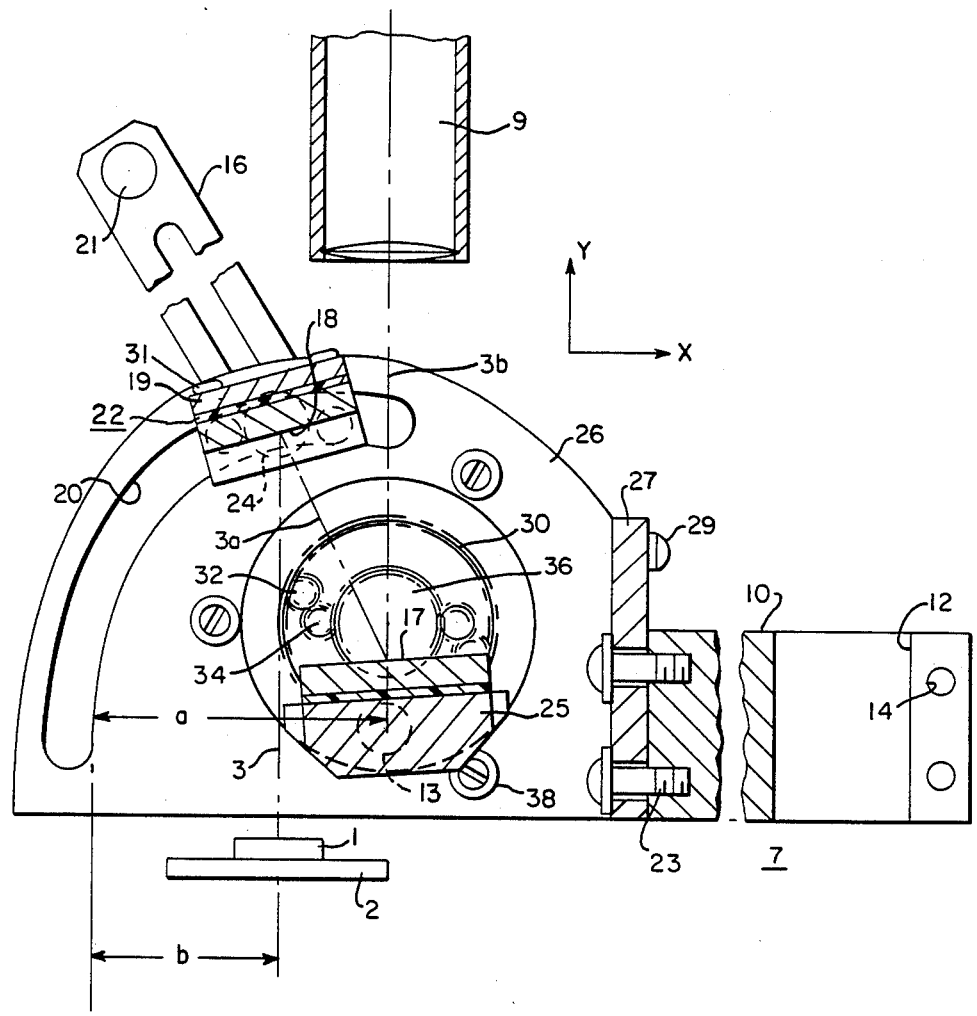
FIG. 3 is a cross-section of a third embodiment of the oblique observation attachment, having the slotted handle so positioned such that the subject under observation is viewed at an angle normal to the subject.

FIG. 3, a cross section of a third embodiment of the oblique observation attachment 7 is a completed prototype of this device. Solid support bar 10, comprises an aperture 12 into which the tubular barrel of the microscope 9 can be inserted for attachment via threaded closure pin 14. Support bar 10 is attached by two threaded means 23, to an interconnecting plate 27. Attached to the interconnecting plate 27 is on each side parallel metal semicircular plate 26. These parallel semicircular plates 26, contain the elliptical track follower guide holes 20. Teflon bearings 24, ride within these guide holes 20. The curvature of the guide holes 20, is again calculated utilizing the same formula for an ellipse as used in FIGS. 1A and 2 specifically;

$$X^2/b^2 + Y^2/a^2 = 1$$

where:
 a=is the distance from the midpoint of the elliptical track follower, or one radius of the complete circle which could be made from the elliptical track follower;
 b=the width of the elliptical track follower to the midpoint of the X-Y stage.

Interconnecting plate 27 is attached to the two parallel, metal semicircular plates 26 by multiple threaded means.

The elliptical track follower concept used in cross section FIG. 3 replaces the plano-elliptical mirror as utilized in FIGS. 1, 1A and 2. Instead of a curved mirror 15 to reflect light energy from the populated subject 1; a planar mirror 18 is attached to a support plate 19 and this fixed planar mirror 18 is moved through an arc of positions using an elliptical track follower.

The elliptical track follower comprises the fixed planar mirror 18, attached to the support plate 19. Two rectangular support blocks 22 are affixed via threaded means 31 to the opposing ends of this support plate 19. Teflon bearings 24 are connected to each rectangular support block 22. These teflon bearings 24 interfit within the elliptical track follower guide holes 20 which are cut into the two parallel semicircular plates 26.

Further, these teflon bearings 24 are operable to slide within notched handles 16. Slotted handles 16 are joined together at one end by a common bar 21 which is held in place by threaded means 28. When bar 21 is lifted upward towards the Y direction, the teflon bearings 24 slide within the slotted handles 16. This movement causes the rectangular blocks 22 to move also thereby causing movement of the back support plate 19 and finally the planar reflective means 18. The elliptical track followers shown in FIG. 3 facilitate the movement of the planar reflective means 18 along the path of an ellipse.

As can be further seen in FIG. 3, a fixed planar reflective means 17 is connected to the elliptical track follower by planar reflective support means 13. The fixed planar reflective means 17 is attached to a first back plate 25. This back plate 25 is interconnected at the extreme ends thereof to two large internal toothed gears 30 such that when the common bar 21 is moved upward during oblique observation attachment 7 operation; slotted handles 16 move upward, thereby moving the planar reflective support means 13 in a clockwise manner and causing the two large internal toothed gears 30 to also move in a clockwise fashion. These two large internal toothed gears 30 are attached to the two elliptical track follower guide hole support plates 26.

Interconnected within the two large internal toothed gears 30 are four small external toothed gears 32. These small gears 32 are interconnected within internal toothed gear 30 on both semicircular plates 26. Four external toothed gears 34 also contact small toothed gears 32, and large external toothed connecting gear. During the movement of bar 21, and the clockwise movement of the planar reflective support structures 13, the small external toothed gears 32 also move in a clockwise direction. The small external toothed gears contacting gears 32, move in a counterclockwise direction resulting from the driving of the large external toothed gears 30. This gear linkage results in a 2 to 1 reduction in the angular position of the planar reflective means connected to the elliptical track follower relative to the fixed planar reflective means 17. When the planar reflective means 18 of the elliptical track follower moves 90°, the fixed planar reflective means 17 moves only 45°.

FIG. 3 therefore is a cross section of the oblique observation attachment 7 viewing a populated planar subject 1 resting upon an X-Y stage 2 in a normal position. Optical energy 3 strikes the planar reflective means 18 attached to the backing plate 19 and two rectangular blocks 22. During viewing in this position with the slotted handles 16 upright, the microscope 9 can be focused. Now if the observer of the populated planar subject 1 wishes to observe the subject 1 at an angle oblique to the subject 1 to for example inspect for solder joints a circuit board manufacturing errors; the observer can move the slotted handles 16 (via the bar 21) into a position almost parallel to the X axis. The subject 1 need not be moved and refocusing of the microscope 9 will not be necessary.

Figure 3A:
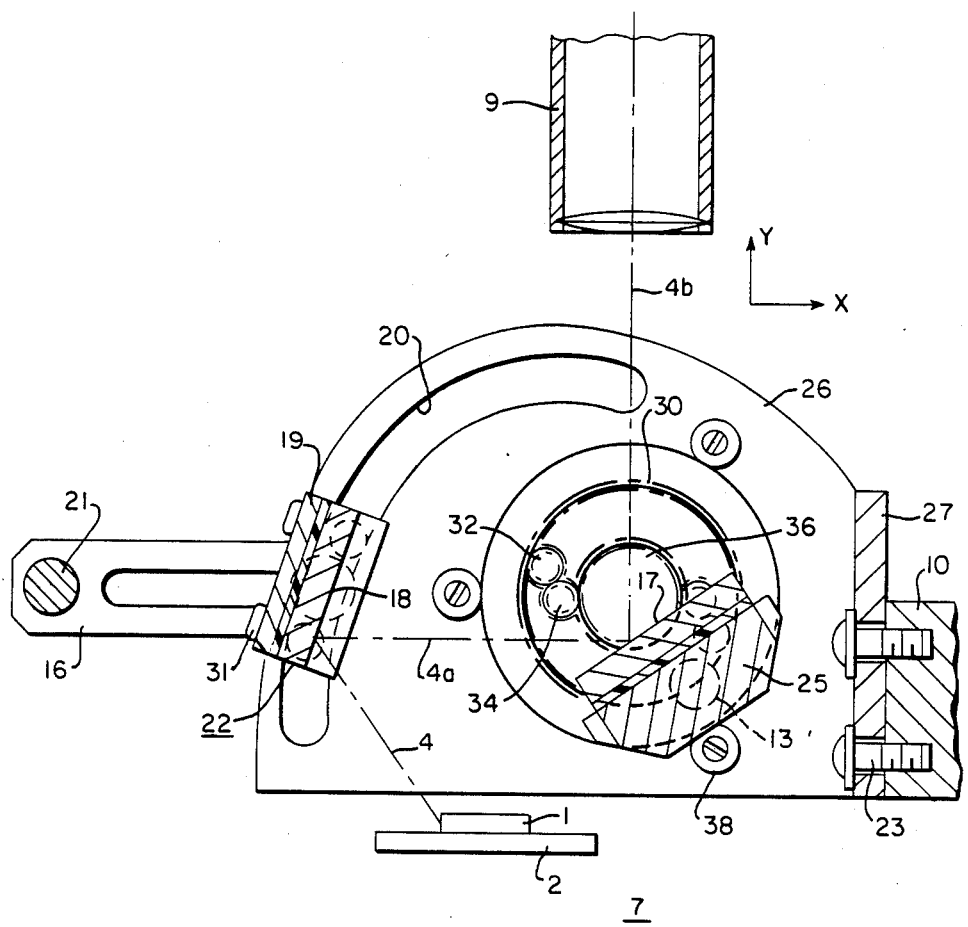
FIG. 3A is a cross-section of a third embodiment of the oblique observation attachment, having the slotted handle so positioned such that the subject under observation is viewed at a position oblique to the subject.

In FIG. 3A, the oblique observation attachment 7 will allow viewing of the populated planar subject 1 at an oblique angle. The slotted handles 16 of the observation attachment 7 have been positioned almost parallel to the X axis by a downward pressure on the common bar 21. The two teflon bearings 24 slide within the elliptical track follower guides 20 cut into the support plates 26. The rectangular support blocks 22 affixed to the elliptical track follower backing plate 19 move with the slotted handles 16 resulting in the repositioning of the fixed planar elliptical track follower reflective means 18. Optical energy 4 from the populated planar subject 1, resting upon the X-Y stage 2 bounces off the repositioned reflective means 18. The reflected energy 4a strikes the fixed planar reflective means 17 which is connected to the slotted handles 16 and the reduction gear linkage 30, 32, 34. The reflected energy 4a bounces off the reflective means 17 as energy 4b which exists the oblique attachment 7 through the microscope 9.

Finally, FIG. 4 is a plan view of the third embodiment of the oblique observation attachment 7. The solid support bar 10 with aperture 12 awaits connection to a tubular means on a microscope 9. The threaded means 14 will retain the solid support bar 10 in contact with a tubular means attached to the microscope 9. The interconnecting plate 27 is attached to the support bar 10 via threaded means 23. Further, attached to the interconnecting plate 27 are two side support plates 26 via threaded means 29. The slotted handles 16 connected via the solid bar 21 and the thread means 28 is shown in the oblique position. The second reflective means 17 is shown partially hidden by the back plate 19 of the first reflective means 18.

Numerous variations may be made in the above-described combination and in different embodiments of this invention. They may be made without departing from the spirit thereof. Therefore, it is intended that all matter contained in the foregoing description and in the accompanying drawings shall be interpreted as illustrative and thus not in a limiting sense.

We claim:

1. An oblique observation attachment for use in conjunction with a microscope operable in a three axis (X, Y, Z) cartesian coordinate system to provide normal and oblique optical inspection of populated planar subjects, comprising:

a retaining ring means positioned around said microscope parallel to said X axis and perpendicular to said Y axis operable to attach said oblique observation attachment to said microscope and further operable to maintain said oblique observation attachment on a common colinear axis with the objective lens of said microscope;

a support ring means positioned around said retaining ring means encircling same, said support ring means parallel to said X axis and perpendicular to said Y axis said support ring means operable to support said oblique observation attachment;

at least one planar reflective means support member interconnected to said support ring positioned parallel to said Y axis and perpendicular to X axis operable to support a planar reflective means;

a planar reflective means interconnected to said planar reflector means support member positioned on a common colinear axis with said objective lens of said microscope operable to be pivoted about a point upon said planar reflective means member through 360° of rotation about the Z axis and further operable to reflect optical energy;

an X-Y stage positioned beneath said planar reflective means on a common colinear axis with said planar reflective means and said objective lens of said microscope, said X-Y stage operable to hold and support said populated planar subjects;

and a plano-elliptical reflective means positioned parallel to said Y axis and perpendicular to said X axis, said plano-elliptical reflective means operable to receive and reflect optical energy from said populated planar subject held by said X-Y stage and further operable to reflect said optical energy to said planar reflective means whereby said optical energy is then reflected to said objective lens of said microscope by said planar reflective means.

2. The oblique observation attachment as in claim 1 where said planar reflective means is a mirror.

3. The oblique observation attachment as in claim 1 where said plano-elliptical means is a mirror.

4. The oblique observation attachment as in claim 1 where said X-Y stage is positioned at a 90° angle to said Y axis.

5. An oblique observation attachment for use in conjunction with a microscope operable in a three axis (X, Y, Z) cartesian coordinate system to provide normal and oblique optical inspection of populated planar subjects without the necessity of refocusing said microscope, comprising:

a support bar positioned parallel to said X axis said support bar further comprising a hole, operable to permit said support bar means to encircle a member of said microscope;

an interconnecting plate means perpendicular to said X axis connected to said support bar, said interconnecting plate means operable to connect and support at least an elliptical track follower plate;

at least one elliptical track follower plate means positioned parallel to said X axis, said plate further comprising a slot cut into said plate, said slot having the configuration of an ellipse;

at least one slotted handle means operable to interfit said slot having the configuration of an ellipse, said slotted handle further operable to be repositioned within said slot;

a first fixed planar reflective means, in its original position perpendicular to said X axis interconnected and further movable within said slotted handle and within said slot within said elliptical track follower plate, said fixed planar reflective means operable to move in the same direction as said slotted handle during oblique observation attachment operation; said first fixed planar reflective means further operable to reflect optical energy reflected from said populated planar subjects;

a second fixed planar reflective means interconnected to said elliptical track follower plate, said second fixed planar reflective means further operable to reflect said optical energy reflected from said first fixed planar reflective means of said oblique observation attachment means into said attached microscope; and a reduction gear linkage means interconnected to said elliptical track follower support plate, said reduction gear linkage means further attached to said slotted handles and said second fixed planar reflective means and said reduction gear linkage means further operable to move said second fixed reflective means in a clockwise direction about said Z axis approximately one-half as many degrees of arc as said first reflective means moves in said same clockwise direction facilitating the point of view of said microscope of said populated planar subject to vary from normal to said subject, and to oblique to said subject without movement of said populated planar subject beneath said oblique observation attachment of the refocusing of said microscope.

6. As in claim 5 wherein said support bar means is operable to be rotated about said Y axis thereby providing a 360° rotation about said populated planar subject by said oblique observation attachment.

7. The oblique observation attachment as in claim 5 wherein said first fixed reflective means is a mirror.

8. The oblique observation attachment as in claim 5 wherein said second fixed reflective means is a mirror.

9. The oblique observation attachment as in claim 5 wherein said reduction gear linkage further comprises;

a large internal toothed gear attached to said elliptical track follower, said large internal toothed gear operable to move in a clockwise motion when said slotted handles are raised, and in a counterclockwise motion when said slotted handle is depressed; said large external toothed gear further interconnected to a first small external toothed gear, said first small external toothed gear moving in the direction opposite said large internal toothed gear, said first small external toothed gear further interconnected with a second small external toothed gear, said second small external toothed gear operable to move in the same direction as said large external toothed gear during said oblique observation attachment operation; and a large internal toothed gear, said large internal toothed gear interconnected to said second small external toothed gear and said second planar reflective means such that during said oblique observation attachment operation said second planar reflective means will move in the same direction as said large external toothed gear but in one half as many degrees of arc.

10. The oblique observation attachment as in claim 5 wherein said populated planar subject is a circuit wiring board.

11. The oblique observation attachment as in claim 5 wherein said populated planar subject is a soldered joint.

* * * * *